(12) United States Patent
Hasegawa

(10) Patent No.: US 9,760,787 B2
(45) Date of Patent: Sep. 12, 2017

(54) DOCUMENT CAMERA SYSTEM AND METHOD FOR READING IMAGE

(71) Applicant: CASIO COMPUTER CO., LTD., Shibuya-ku, Tokyo (JP)

(72) Inventor: Hirokazu Hasegawa, Koganei (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 361 days.

(21) Appl. No.: 14/305,396

(22) Filed: Jun. 16, 2014

(65) Prior Publication Data
US 2014/0375802 A1 Dec. 25, 2014

(30) Foreign Application Priority Data

Jun. 25, 2013 (JP) ................................ 2013-132427

(51) Int. Cl.
*G06K 9/20* (2006.01)
*A47B 23/00* (2006.01)
(Continued)

(52) U.S. Cl.
CPC .......... *G06K 9/2054* (2013.01); *G06T 7/0002* (2013.01); *H04N 1/19594* (2013.01);
(Continued)

(58) Field of Classification Search
CPC .. H04N 7/18; H04N 1/04; H04N 1/40; H04N 1/00; A47B 23/00; G06K 9/20; G06K 9/2054; B26D 3/08; B32B 9/00
See application file for complete search history.

(56) References Cited

U.S. PATENT DOCUMENTS

| 2005/0255275 A1* | 11/2005 | Downs | B42F 5/00 428/42.3 |
| 2007/0045503 A1* | 3/2007 | Samari | A47B 23/06 248/445 |
| 2007/0227332 A1* | 10/2007 | Causse | B26D 7/015 83/879 |

FOREIGN PATENT DOCUMENTS

| JP | 05124379 A | 5/1993 |
| JP | 06259596 A | 9/1994 |

(Continued)

OTHER PUBLICATIONS

Japanese Office Action (and English translation thereof) dated Sep. 29, 2015, issued in counterpart Japanese Application No. 2013-132427.
(Continued)

*Primary Examiner* — Sath V Perungavoor
*Assistant Examiner* — Patricia I Young
(74) *Attorney, Agent, or Firm* — Holtz, Holtz & Volek PC

(57) ABSTRACT

A document camera system includes a page-turning device, an image pickup unit, a specification unit, a recognition unit, a determination unit and a notification unit. The page-turning device turns pages of a book. The image pickup unit picks up an image of each turned page. The specification unit specifies a page number portion in the image picked up by the image pickup unit. The recognition unit recognizes characters in the page number portion specified by the specification unit to identify a page number. The determination unit determines correctness of the order of the page numbers identified by the recognition unit. The notification unit notifies a user of an error when the determination unit determines that the order of the page numbers is incorrect.

2 Claims, 11 Drawing Sheets

(51) Int. Cl.
    *G06T 7/00* (2017.01)
    *H04N 1/195* (2006.01)
(52) U.S. Cl.
    CPC .............. *G06T 2207/30176* (2013.01); *H04N 2201/0434* (2013.01); *H04N 2201/0436* (2013.01)

(56) References Cited

FOREIGN PATENT DOCUMENTS

| JP | 2007081841 A | 3/2007 |
| JP | 2011051233 A | 3/2011 |
| JP | 2012065261 A | 3/2012 |

OTHER PUBLICATIONS

Japanese Office Action (and English translation thereof) dated Mar. 14, 2017 issued in counterpart Japanese Application No. 2015-231204.

* cited by examiner

FIG.8
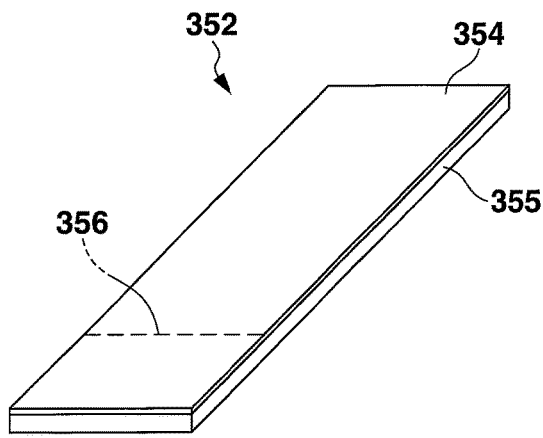
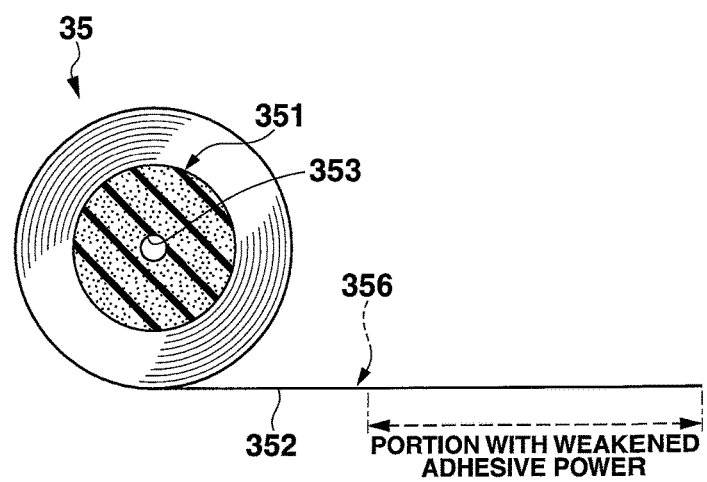
FIG.9A
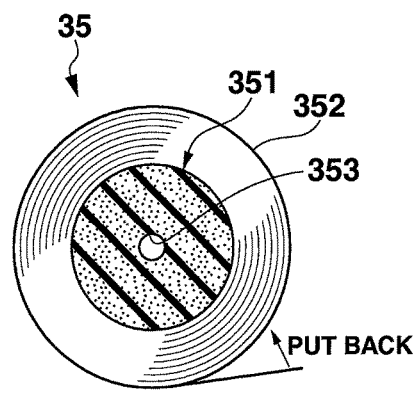
FIG.9B

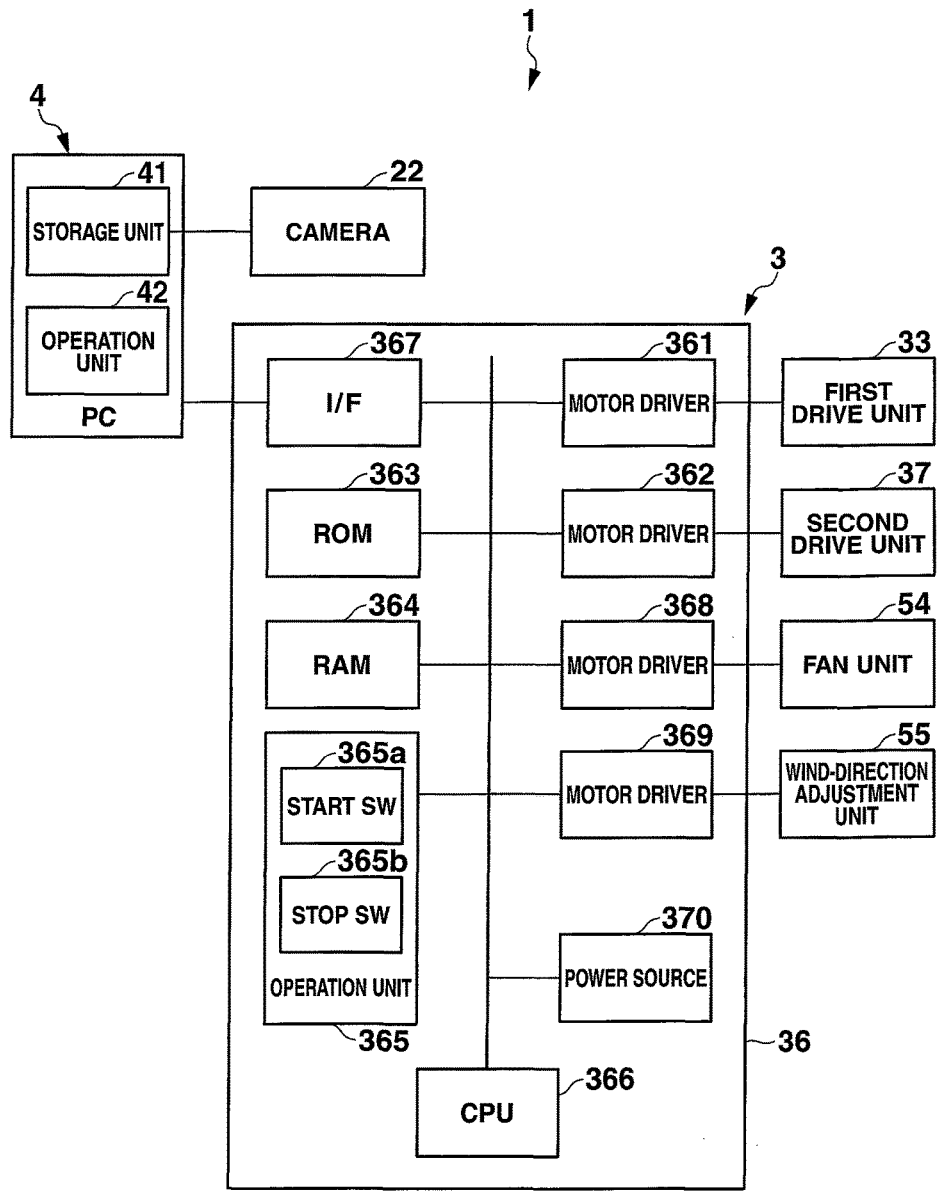

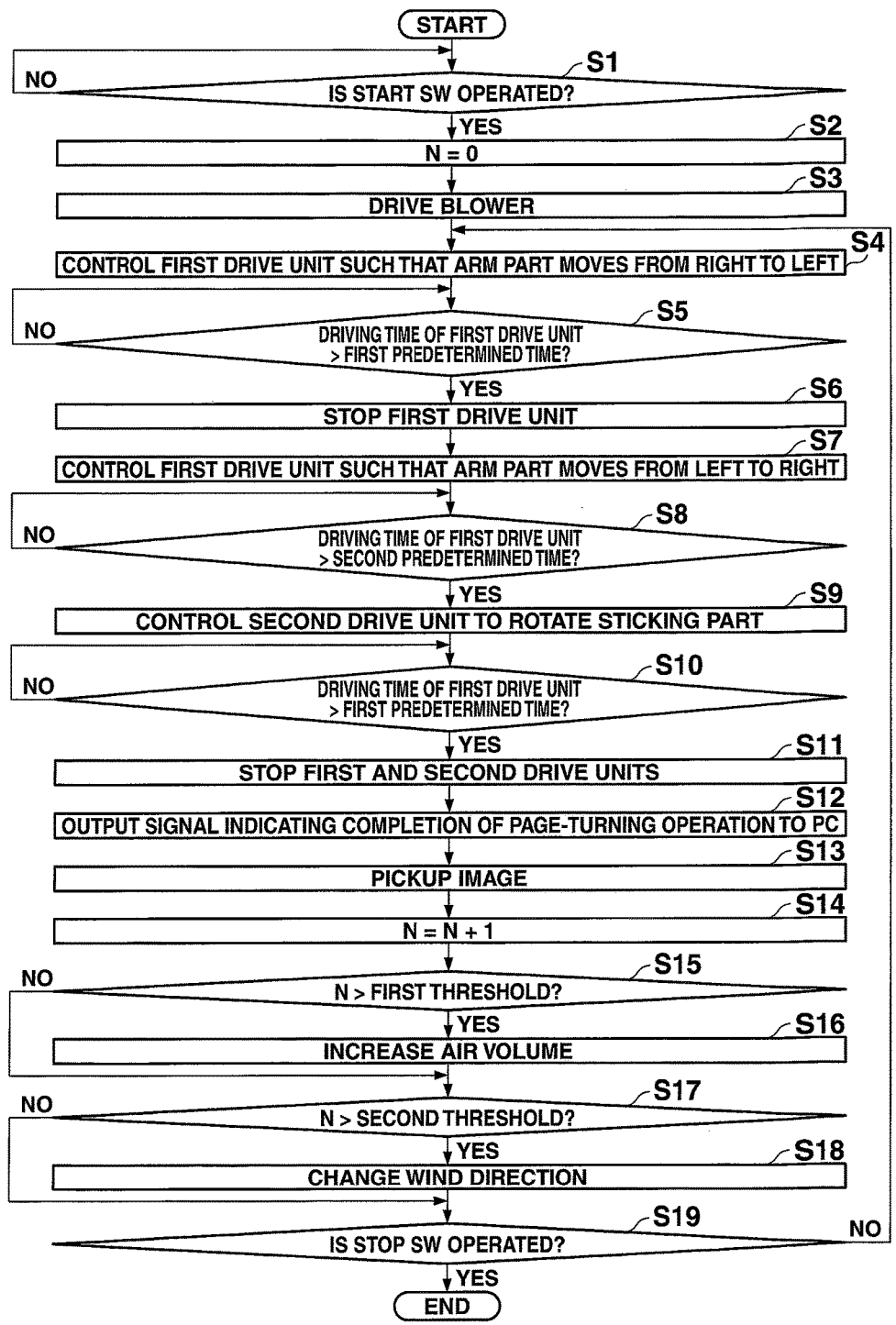

DOCUMENT CAMERA SYSTEM AND METHOD FOR READING IMAGE

CROSS REFERENCE TO RELATED APPLICATION

This application is based upon and claims the benefit of priority under 35 USC 119 of Japanese Patent Application No. 2013-132427 filed on Jun. 25, 2013, the entire disclosure of which, including the description, claims, drawings and abstract, is incorporated herein by reference in its entirety.

BACKGROUND OF THE INVENTION

1. Field of the Invention

The present invention relates to a document camera system and a method for reading an image.

2. Description of Related Art

A typical page-turning device is disclosed that sequentially separates each page from the stacked pages of a book and automatically turns the page (see Japanese Unexamined Patent Application Laid-Open Publication No. 2011-051233, for example). Images of the turned pages are picked up one by one to be digitized. The page-turning device disclosed in the above publication No. 2011-051233 can reconfigure control items for the turning of pages, to prevent unsuccessful turning (turning no page) and multiple turning (turning two or more pages at once).

SUMMARY OF THE INVENTION

Unfortunately, the page-turning device disclosed in the above publication No. 2011-051233, which is aimed to prevent the unsuccessful turning and multiple turning, cannot readily check for duplicate pages or a missing page in the scanned pages, even if they are present. Eagerly anticipated is easy checking for duplicate images and a missing image in the captured images.

An object of the invention is to facilitate checking for duplicate pages and a missing page in the scanned pages.

In order to achieve at least one of the objects, according to a first aspect of the present invention, there is provided a document camera system including: a page-turning device which turns pages of a book; an image pickup unit which picks up an image of each turned page; a specification unit which specifies a page number portion in the image picked up by the image pickup unit; a recognition unit which recognizes characters in the page number portion specified by the specification unit to identify a page number; a determination unit which determines correctness of the order of the page numbers identified by the recognition unit; and a notification unit which notifies a user of an error when the determination unit determines that the order of the page numbers is incorrect.

In order to achieve at least one of the objects, according to a second aspect of the present invention, there is provided a method for reading an image including: a page-turning processing of turning each page of a book; an imaging processing of picking up an image of each page of a book; a specification processing of specifying a page number portion in the image picked up in imaging processing; a recognition processing of recognizing characters in the page number portion specified in the specification processing to identify a page number; a determination processing of determining correctness of the order of the page numbers identified in the recognition processing; and a notification processing of notifying a user of an error when the order of the page numbers is determined to be incorrect in the determination processing.

BRIEF DESCRIPTION OF THE DRAWINGS

The present invention will become more fully understood from the detailed description given hereinafter and the appended drawings, which are given by way of illustration only and thus are not intended as a definition of the limits of the present invention, wherein:

FIG. 8 is a perspective view schematically showing the structure of an adhesive component according to the embodiment;

FIG. 9A and FIG. 9B illustrate a process of removing the adhesive component when the adhesive power has weakened;

FIG. 10 is a block diagram showing the main control configuration of the document camera system according to the embodiment;

FIG. 11 is a flowchart of page-turning processing by the page-turning device of the embodiment;

DETAILED DESCRIPTION OF THE PREFERRED EMBODIMENT

Hereinafter, an embodiment of the present invention will be described with reference to the drawings. Though various technical limitations which are preferable to carry out the present invention are added to the after-described embodiment, the scope of the invention is not limited to the following embodiment and the illustrated examples.

Figure 1:
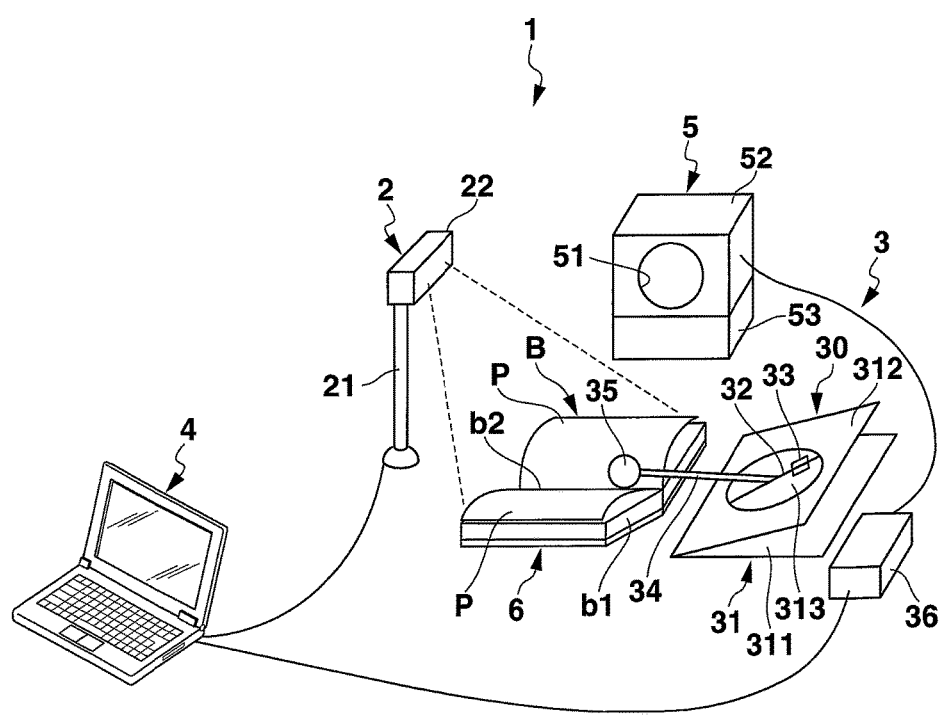
FIG. 1 is a perspective view schematically showing the configuration of a document camera system according to an embodiment of the present invention.
Figure 2A:
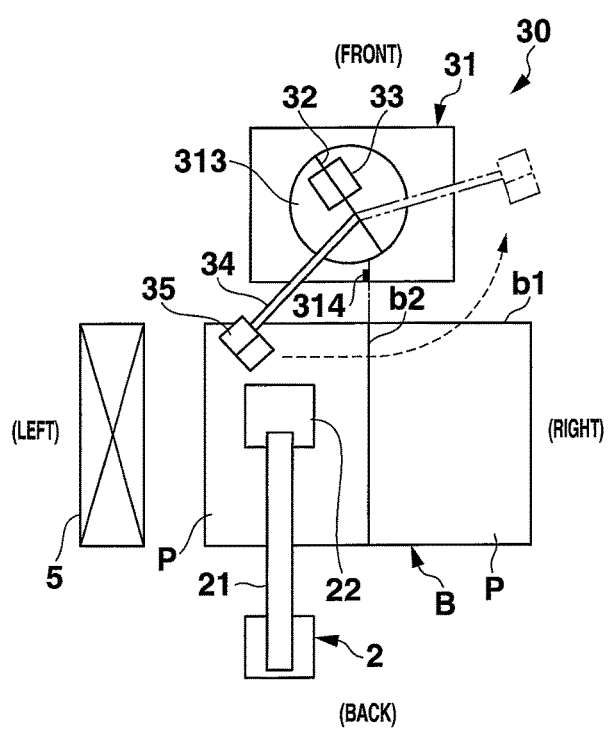
FIG. 2A is a top view showing the configuration of the essential part of the document camera system in FIG. 1.
Figure 2B:
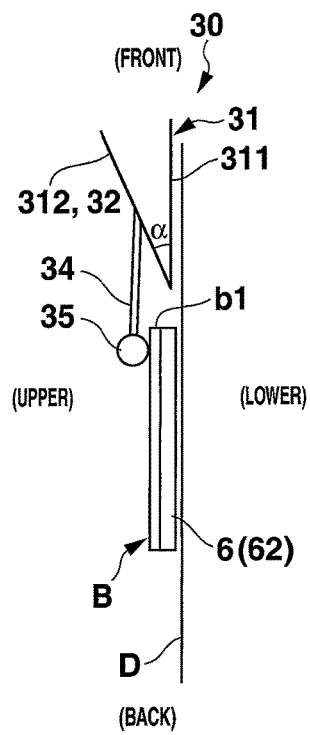
FIG. 2B is a side view showing the configuration of the essential part of the document camera system in FIG. 1.
Figure 3:
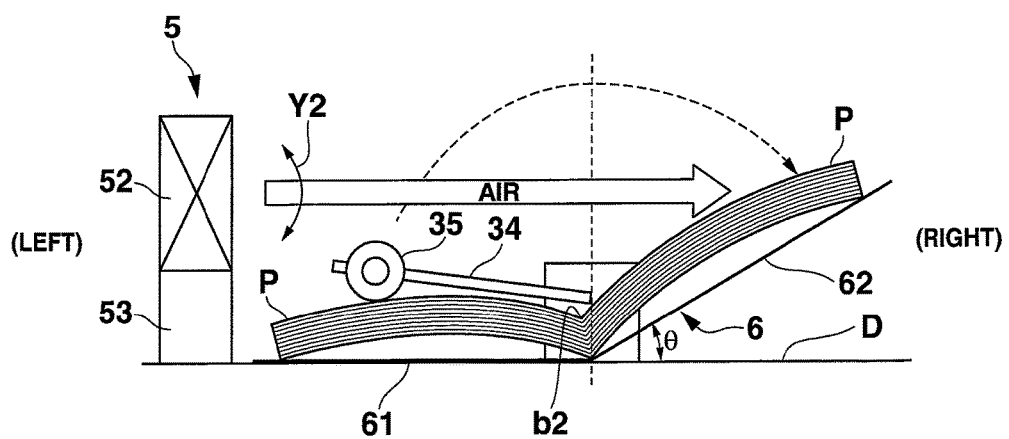
FIG. 3 is an elevation view showing a route of a sticking part provided on the top end of an arm part according to the embodiment.

FIG. 1 is a perspective view schematically showing the configuration of a document camera system as an image-reading device according to the present invention. FIG. 2A and FIG. 2B illustrate the configuration of the essential part of the document camera system, wherein FIG. 2A is a top view, and FIG. 2B is a side view. FIG. 3 is an elevation view showing the essential part of the document camera system. In the explanation hereinafter, pages P of a book B are turned from left to right.

As shown in FIG. 1 to FIG. 3, a document camera system 1 includes: a document camera 2 as an image pickup unit which picks up images of pages P of the book B; a page-turning device 3 which turns pages P of the book B; and a personal computer 4 connected to the document camera 2 and the page-turning device 3 such that the computer 4 can communicate with the document camera 2 and the page-turning device 3.

The document camera 2 includes a stand part 21 and a camera 22 attached to the upper end of the stand part 21. The stand part 21 is inclinable in the front-back direction and the left-right direction, and extensible in the up-down direction, so that a positional relationship of the book B and the camera 22 can be adjusted. A lens of the camera 22 faces downward such that the book B comes within an angle of view. A position-adjustment mechanism is disposed at the joining portion of the camera 22 and the stand part 21, so that the facing direction of the lens of the camera 22 can be adjusted.

In this embodiment, the camera 22 is positioned above the left pages P to image only the left pages P.

The page-turning device 3 includes: a support base 6 which supports the book B being opened; a turning unit 30 which holds a page P at a departure position of pages P of the book B and which releases the holding of the page P at a destination position of pages P; a blower 5 which sends air above a page P at the departure position to blow against a page P at the destination position; and a control unit 36 which controls these parts and the like.

As shown in FIG. 3, the support base 6 includes a couple of support plates 61, 62. The support base 6 can be folded up by using a hinge, which is not shown in drawings. When pages P of the book B are turned from left to right as shown in FIG. 3, a first support plate 61 of the support plates 61, 62 which is disposed on the left is laid on the desk D, and a second support plate 62 which is disposed on the right is placed on the desk D such that the second support plate 62 is inclined at a predetermined angle as if the second support plate 62 approaches the first support plate 61. Pages P at the departure position is placed on the first support plate 61, while pages P at the destination position is placed on the second support plate 62.

When pages P of the book B are turned from right to left, the second support plate 62 which is disposed on the right is laid on the desk D, and the first support plate 61 which is disposed on the left is placed on the desk D such that the first support plate 61 is inclined at a predetermined angle as if the first support plate 61 approaches the second support plate 62. Pages P at the departure position is placed on the second support plate 62, while pages P at the destination position is placed on the first support plate 61.

Thereby, the support base 6 supports the book B such that a destination position inclined angle between the pages P at the destination position and an horizontal plane is larger than a departure position inclined angle between the pages P at the departure position and the horizontal plane. Since the support base 6 can be folded up by using a hinge between the support plates 61, 62, an angle between the support plates 61, 62 is adjustable. Therefore the destination position inclined angle $\theta$ between the pages P at the destination position and the horizontal plane is adjustable. The destination position inclined angle $\theta$ is preferably adjusted to 30 to 45 degrees.

The turning unit 30 includes: a base 31; a first drive unit (drive unit) 33, such as a motor, disposed on the base 31 and having a drive shaft 32; an arm part 34 which swings around the drive shaft 32; and a sticking part 35 attached to the top end of the arm part 34, the sticking part 35 sticking to or separating from a page P of the book B.

The base 31 is disposed on a desk D such that one side of the base 31 is parallel to the upper side b1 of the book B opened on the support base 6. In the explanation hereinafter, "back" is defined as a side where the book B is disposed, i.e. the book B side, and "front" is defined as a side where the base 31 is disposed, i.e. the base 31 side. The seam b2 of the book B is along the front-back direction. The base 31 includes a main base 311 and a sub base 312 which is superposed on the main base 311 and can adjust an angle $\alpha$ between the main base 311 and the sub base 312. On the back end (the end on the book B side) of the sub base 312, a hinge (not shown) is disposed. This hinge makes the angle $\alpha$ between the sub base 312 and the main base 311 adjustable. The sub base 312 is provided with a rotating plate 313 which is rotatable and supports the first drive unit 33. The drive shaft 32 of the first drive unit 33 is disposed parallel to the upper surface of the rotating plate 313.

When pages P of the book B are turned from left to right, the angle of the rotating plate 313 is determined such that the back end (the end on the book B side) of the drive shaft 32 turns to right-hand side with respect to the seam b2 of pages P and the front end (the end on a side opposite to the book B side) of the drive shaft 32 as the base end turns to left-hand side with respect to the seam b2 of pages P. On the other hand, when pages P of the book B are turned from right to left, the angle of the rotating plate 313 is determined such that the back end (the end on the book B side) of the drive shaft 32 turns to left-hand side with respect to the seam b2 of pages P and the front end (the end on the side opposite to the book B side) of the drive shaft 32 turns to right-hand side with respect to the seam b2 of pages P.

Whichever the turning direction is, the drive shaft 32 is inclined such that the base end of the drive shaft 32 is on a side where a departure position of pages P exists (departure position side) with respect to the seam b2 of the book B and also inclined at the angle $\alpha$ with respect to a plane on which the book B is put (horizontal plane).

Also, a mark 314 for locating is formed at the back end (the end on the book B side) of the sub base 312. It is preferable to locate the base 31 such that this mark 314 is on the extension of the seam b2.

The arm part 34 is inclined with respect to the drive shaft 32 toward the book B side. As the drive shaft 32 rotates, the arm part 34 goes to and fro (shuttle operation) between the departure position and a destination position of pages P as if the arm part 34 draws a circular arc around the drive shaft 32. That is to say, the drive shaft 32 is a symmetry axis of swing of the arm part 34. In the explanation hereinafter, a movement from the departure position to the destination position of pages P is referred to as an outward movement (a motion of going), and a movement from the destination position to the departure position is referred to as a homeward movement (a motion of return).

FIG. 3 is an elevation view (viewed in a direction along an axis of the seam b2 of pages P or viewed from a plane side, the normal line of which is parallel to the seam b2) showing a route of the sticking part 35 provided on the top end of the arm part 34. As shown in FIG. 3, in the outward movement, the sticking part 35 on the top end of the arm part 34 moves from a position which contacts the departure position of pages P to the destination position of pages P as if the sticking part 35 draws a circular arc over pages P.

Figure 4A:
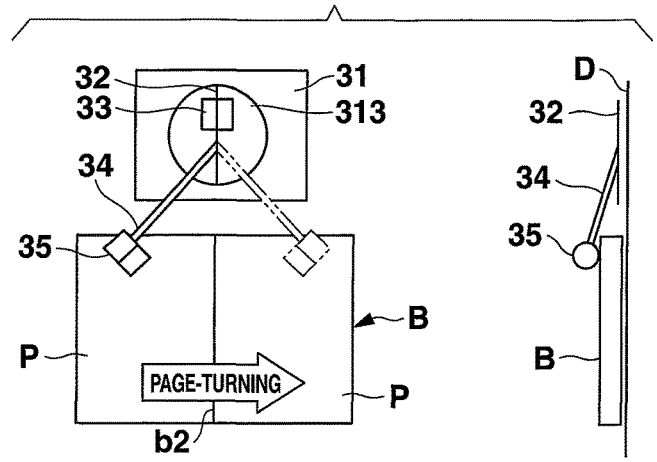
FIG. 4A, FIG. 4B and FIG. 4C schematically illustrate how inclination of a drive shaft of a first drive unit according to the embodiment affects a page-turning operation.
Figure 4B:
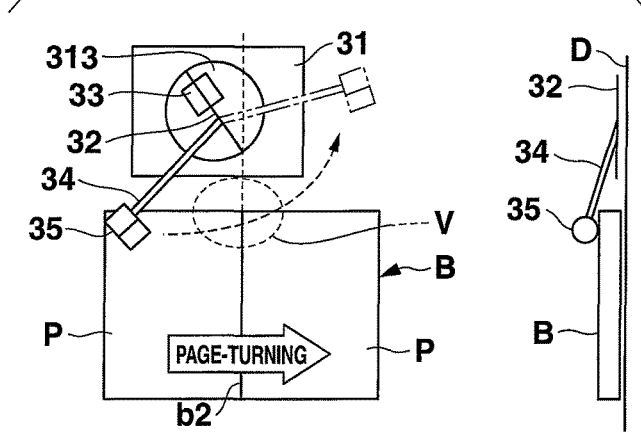
Figure 4C:
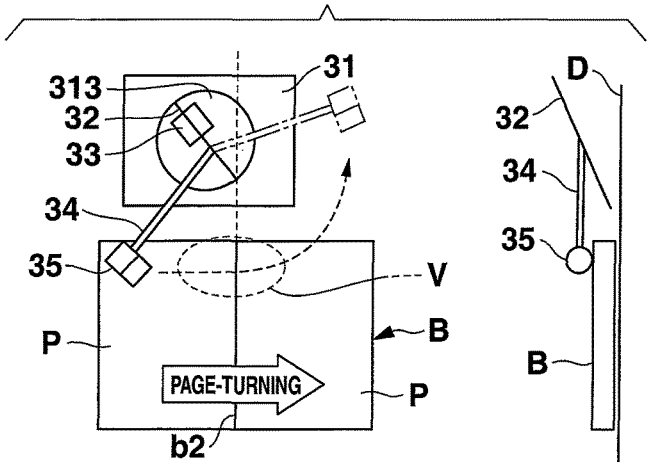

FIG. 4A, FIG. 4B and FIG. 4C schematically illustrate how the inclination of the drive shaft 32 affects the page-turning operation of pages P. FIG. 4A, FIG. 4B and FIG. 4C show the book B placed not on the support base 6 but directly on the desk D so that the configuration can be easily understood. FIG. 4A illustrates a case where the drive shaft 32 is horizontally disposed on the extension of the seam b2. In this case, since the sticking part 35 moves along a route the symmetry axis of which corresponds to the seam b2, the sticking part 35 keeps in contact with the right-side page P at the destination position of pages P without being able to separate from the page P.

FIG. 4B illustrates a case where the drive shaft 32 is horizontal and inclined such that the back end of the drive shaft 32 turns to right-hand side with respect to the seam b2 of pages P and the front end of the drive shaft 32 as the base end turns to left-hand side with respect to the seam b2 of pages P. In this case, after the sticking part 35 sticks to a page P at the departure position, the arm part 34 rotates around the drive shaft 32, and at the end point of the outward movement, the sticking part 35 separates from the book B forward. Therefore, the sticking part 35 can easily separate from the sticking page P.

In this case, however, pages P cannot always be turned smoothly. One possible cause is that the distance between the book B and the sticking part 35 becomes long in the first phase to the middle phase (the ellipse V) of the page-turning operation.

FIG. 4C illustrates a case where the drive shaft 32 is inclined with respect to the seam b2 of the book B and is also inclined with respect to the horizontal plane, i.e. a case of the drive shaft 32 according to the embodiment. In this case, the distance between the book B and the sticking part 35 in the first phase to the middle phase (the ellipse V) of the page-turning is shorter than that in the case shown in FIG. 4B.

Figure 5A:
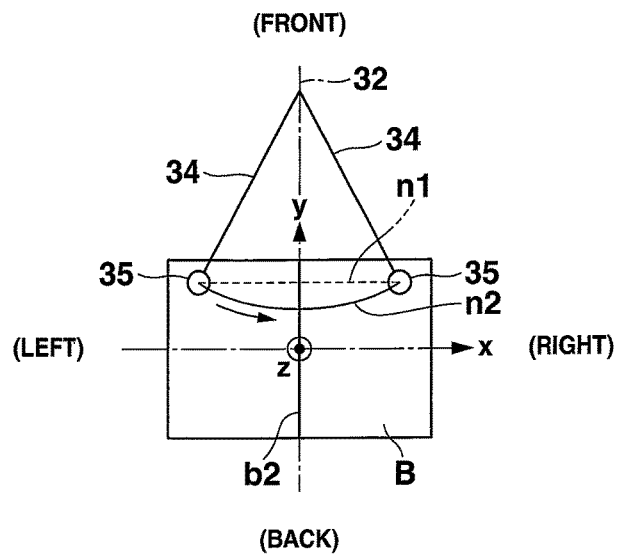
FIG. 5A, FIG. 5B and FIG. 5C are respectively a top view, a side view and an elevation view, schematically showing difference of routes of the sticking part between a case where the drive shaft of the first drive unit is horizontal and a case where the drive shaft is inclined with respect to the vertical line standing perpendicular to the seam.
Figure 5B:
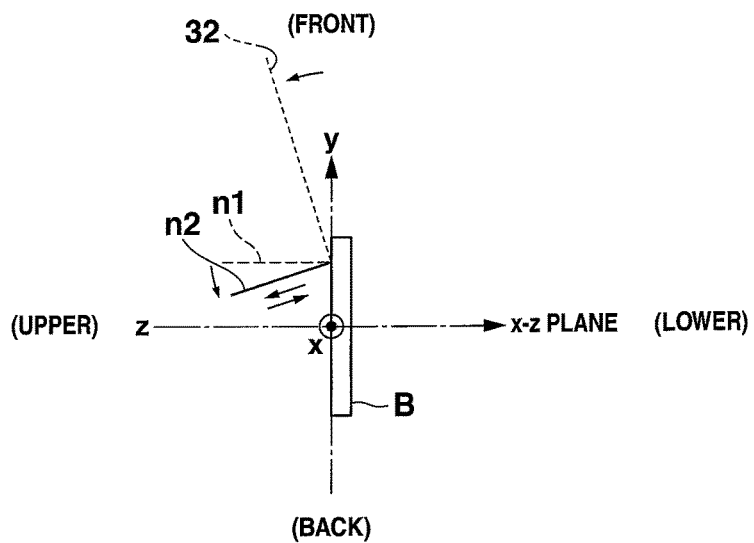
Figure 5C:
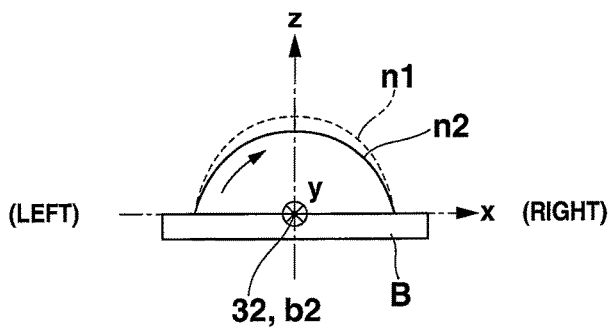

To be more specific, FIG. 5A, FIG. 5B and FIG. 5C schematically illustrate difference of routes of the sticking part 35 between a case where the drive shaft 32 is horizontal and a case where the drive shaft 32 is inclined with respect to the horizontal plane, wherein FIG. 5A is a top view, FIG. 5B is a side view, and FIG. 5C is an elevation view. In FIG. 5A, FIG. 5B and FIG. 5C, the left-right direction, the up-down direction and the vertical direction of the book B are respectively defined as an x direction, a y direction and a z direction. In FIG. 5A, FIG. 5B and FIG. 5C, the drive shaft 32 aligns with the seam b2 of the book B in order to clarify the point that the drive shaft 32 of the embodiment is inclined with respect to the horizontal, plane. As shown in FIG. 5A, FIG. 5B and FIG. 5C, in the case where the drive shaft 32 is horizontal (dot lines in the figures), the locus n1 of the sticking part 35 is a straight line along the left-right direction in the top view (FIG. 5A), a straight line along the vertical direction in the side view (FIG. 5B) and a semicircle in the elevation view (FIG. 5C). On the other hand, in the case where the drive shaft 32 is inclined with respect to the horizontal plane (solid lines in the figures), the locus n2 of the sticking part 35 is a circular arc being convex backward in the top view (FIG. 5A), a straight line with its upper end being inclined backward in the side view (FIG. 5B) and a deformed semicircle in the elevation view (FIG. 5C). The locus n2 in FIG. 5B shows the locus plane of the driven sticking part 35 viewed from the side. It shows that the locus n2 is inclined with respect to a plane (x-z plane) including the left-right direction of the book B and a normal line of the book B.

As is known from FIG. 5C, the distance from the sticking part 35 to the seam b2 when the sticking part 35 passes over the seam b2 is shorter than the distance from the sticking part 35 to the seam b2 when the sticking part 35 sticks to a page P at the departure position. That is to say, the locus n2 can make the distance from the book B to the sticking part 35 when the sticking part 35 passes over the seam b2 shorter than the locus n1.

Thus, according to the embodiment shown in FIG. 4C, in the second phase of the page-turning, the distance between the book B (the seam b2) and the sticking part 35 becomes long, so that the sticking part 35 can easily separate from the sticking page P. Also, in the first phase to the middle phase (the ellipse V) of the page-turning operation, the distance between the book B (the seam b2) and the sticking part 35 becomes short, so that a page P can be slackened appropriately. Therefore, pages P can be reliably turned.

In the homeward movement, the moving direction is opposite to that in the outward movement, and the sticking part 35 takes the same route as that of the outward movement, moves keeping a distance from pages P and, in the end, sticks to another page P at the departure position of pages P. Repeating this shuttle operation progresses the page-turning operation of pages P.

In the present embodiment, the drive shaft 32 is inclined with respect to the seam b2 of the opened book B and is also inclined with respect to the horizontal plane as shown in FIG. 4C as an example. It is needless to say that if the drive shaft 32 is inclined with respect to either the seam b2 or the horizontal plane, these cases have their respective effects.

If the drive shaft 32 is inclined only with respect to the horizontal plane, as described later, a second drive unit 37 is driven or the sticking part 35 is configured in such a way as to stay at a higher position on the right than that on the left so that the sticking part 35 can easily separate from a page P.

Figure 6:
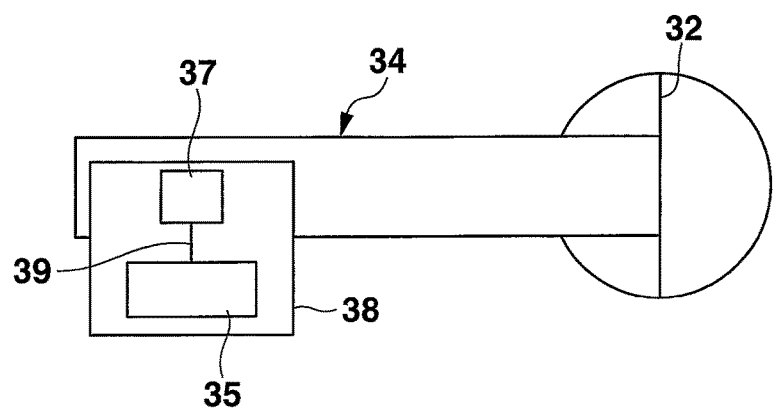
FIG. 6 is a schematic view schematically showing the configuration of the arm part according to the embodiment.

Next, specific configurations of the arm part 34 and the sticking part 35 will be explained. FIG. 6 is a schematic diagram schematically showing the configuration of the arm part 34. The arm part 34 is a plate component the base end of which is attached to the drive shaft 32 as shown in FIG. 6. The sticking part 35 is attached to the top end of the arm part 34 via the second drive unit 37 such as a motor.

The second drive unit 37 is disposed such that a drive shaft 39 of the second drive unit 37 is along a direction perpendicular to the longitudinal direction of the arm part 34. The sticking part 35 is removably attached to the drive shaft 39, and the sticking part 35 rotates as the drive shaft 39 rotates.

Figure 7:
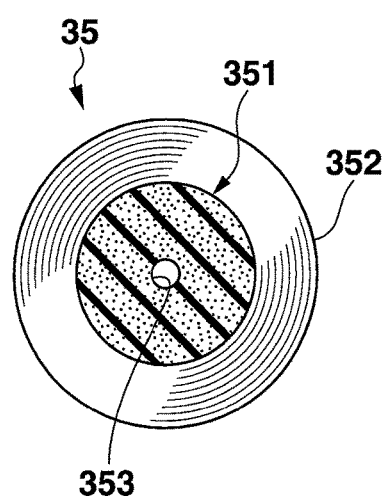
FIG. 7 is an elevation view schematically showing the configuration of the sticking part according to the embodiment.

FIG. 7 is an elevation view schematically showing the configuration of the sticking part 35. As shown in FIG. 7, the sticking part 35 includes a columnar rotating roller 351 and an adhesive component 352 wound around the rotating roller 351.

There has been desire to improve working efficiency in replacement of the sticking parts 35 with respect to the drive shaft 39 of the second drive unit 37. Hence, the rotating roller 351 is made of an elastic body such as a sponge, and a fit hole 353 into which the drive shaft 39 is fitted is formed at the center of the rotating roller 351. Other than the sponge, examples of the elastic body include rubber and foam. The inner diameter of the fit hole 353 is formed to be smaller than the outer diameter of the drive shaft 39. By pushing the drive shaft 39 into the fit hole 353, the rotating roller 351 contracts, and the drive shaft 39 fits in the fit hole 353. Consequently, at the replacement, the rotating roller 351 can be removed from the drive shaft 39 only by pulling the rotating roller 351 to be detached from the drive shaft 39. Thus, since the rotating roller 351 is elastic, the sticking part 35 can be easily put on and removed from the drive shaft 39, and accordingly the sticking part 35 can be easily replaced with another.

FIG. 8 is a perspective view schematically showing the configuration of the adhesive component 352. As shown in FIG. 8, the adhesive component 352 is sheet-shaped and has, for example, a double-sided adhesive structure like a double-sided tape. The adhesive component 352 has a two-layer structure of a weak adhesive layer 354 and a strong adhesive layer 355. The weak adhesive layer 354 is provided on a side which sticks to the book B (surface side). The weak adhesive layer 354 has: weak adhesive power so that pieces of the weak adhesive layer 354 do not remain after the adhesive component 352 is removed; and a property that the weak adhesive layer 354 can be used multiple times. On the other hand, the strong adhesive layer 355 is provided on the opposite side. The strong adhesive layer 355 has adhesive power stronger than the weak adhesive layer 354 so that the strong adhesive layer 355 maintains a state of being wound around the rotating roller 351. Perforations 356 are formed at predetermined length intervals on the adhesive component 352.

FIG. 9A and FIG. 9B illustrate a process of removing the adhesive component 352 when the adhesive power has weakened. When a user feels that the adhesive power has weakened, the user removes the most outer surface of the adhesive component 352 by one round to expose a new portion of the weak adhesive layer 354 of the adhesive component 352 as shown in FIG. 9A. Then, the portion, the adhesive power of which has weakened, can be cut along the perforation 356. At the time of cutting, if a portion thereof temporarily peels off as shown in FIG. 9B, the user puts the portion back. Thus, a new portion of the weak adhesive layer 354 is exposed, so that the page-turning operation can be appropriately resumed.

As shown in FIG. 1 to FIG. 3, the blower 5 is disposed upstream from the departure position of the book B. For example, when pages P of the book B is turned from left to right, the blower 5 is disposed on the left side of pages P which is placed at the departure position of the book B. When pages P of the book B is turned from right to left, the blower 5 is disposed on the right side of pages P which is placed at the departure position of the book B. Therefore the blower 5 is disposed outside the angle of view of the camera 22. The blower 5 includes a blower body 52 and a blower base 53 which supports the blower body 52. The blower body 52 includes an air outlet 51 which sends out air.

The blower body 52 is provided with a fan unit 54 (see FIG. 10) and a wind-direction control unit 55 (see FIG. 10). The fan unit 54 sends air from the air outlet 51. The wind-direction control unit 55 changes a moving direction of a wind (a wind direction) sent from the fan unit 54. The wind-direction control unit 55 changes the wind direction such that the wind blows upward or downward (the direction of the arrow Y2 in FIG. 3) from the air outlet 51.

The blower base 53 supports the blower body 52 at a predetermined height. This blower base 53 is configured such that the air outlet 51 is disposed higher than pages P at the destination position. Therefore a wind which blows from the air outlet 51 passes above pages P at the departure position and blows against pages P at the destination position. Pages P at the departure position is not much affected by the wind, while pages P at the destination position is much affected by the wind.

Next, the main control configuration of a document camera system 1 according to the embodiment will be explained. FIG. 10 is a block diagram showing the main control configuration of the document camera system 1. As shown in FIG. 10, the control unit 36 of the page-turning device 3 includes: a motor driver 361 which drives the first drive unit 33; a motor driver 362 which drives the second drive unit 37; a motor driver 368 which drives the fan unit 54; a motor driver 369 which drives the wind-direction adjustment unit 55; a ROM 363 where a variety of programs are stored; a RAM 364 where the programs stored in the ROM 363 are opened when the programs are executed; an operation unit 365 where a variety of instructions are inputted; a CPU 366 which controls the motor drivers 361 and 362 by opening and executing the programs, which are stored in the ROM 363, in the RAM 364 on the basis of the instructions from the operation unit 365; an I/F 367 to which the computer 4 is connected; and a power source 370.

The operation unit 365 includes a start switch 365a for starting page-turning processing and a stop switch 365b for stopping the page-turning processing. The CPU 366 counts turned pages as a value N from the time when the start switch 365a is operated to the time when the stop switch 365b is operated. The value N is stored in the RAM 364.

The computer 4 includes: a storage unit 41 which stores basic images G (see FIG. 15) picked up by the camera 22 and trimmed images obtained by cutting out only predetermined areas G2 from the basic images G; and an operation unit 42 such as a keyboard, a touch panel and a mouse through which various commands are input to the computer 4.

An image-reading method by the document camera system 1 will be explained hereinafter.

First, page-turning processing in the image-reading method will be explained. FIG. 11 is a flowchart of the page-turning processing.

First, preparation before execution of the page-turning processing will be explained. This is an example wherein only left pages P are continually imaged first, and then right pages P are continually imaged.

A user places an opened book B on the support base 6 and positions the camera 22 above the left pages P of the opened book B.

In the page-turning device 3, the position of the arm part 34 is adjusted such that the sticking part 35 is disposed at the starting point (the end point of the homeward movement) in advance. At the time, a user checks the adhesive power of the adhesive component 352. If the adhesive power is weak, the user removes the weak portion to expose a new portion of the adhesive component 352. Then, the user opens the book B such that one page (one double-page spread) P before a page (a double-page spread) P from which the user would like to start image pickup is exposed and moves the sticking part 35 to the end point of the outward movement (the start point of the homeward movement). When the power source of the page-turning device 3 is turned on, the CPU 366 opens in the RAM 364 a program for the page-turning processing stored in the ROM 363 to execute the program.

As shown in FIG. 11, at Step S1, the CPU 366 determines whether or not the start switch 365a is operated. When determining that the start switch 365a is not operated, the CPU 366 keeps the state as it is. When determining that the start switch 365a is operated, the CPU 366 shifts the processing to Step S2.

At Step S2, the CPU 366 resets the value N, which is stored in the RAM 364, at zero.

At Step S3, the CPU 366 drives the fan unit 54 to carry out blowing with the blower 5. At this time, an air volume of the fan unit 54 is set at an initial air volume. In the beginning of turning pages P, a large number of pages P exist at the departure position, so the thickness of pages P as a whole is large. Therefore the wind-direction adjustment unit is controlled such that a wind from the blower 5 blows in a direction slightly upward from a horizontal plane.

At Step S4, the CPU 366 controls the first drive unit 33 such that the arm part 34 moves from right to left (homeward movement).

At Step S5, the CPU 366 determines whether or not a driving time of the first drive unit 33 exceeds a first predetermined time. When determining that the driving time does not exceed the first predetermined time, the CPU 366 keeps driving the first drive unit 33. When determining that the driving time exceeds the first predetermined time, the CPU 366 shifts the processing to Step S6. The first predetermined time is set at a time length enough for the arm part 34 to move from the start point to the end point of the homeward movement.

At Step S6, the CPU 366 stops the first drive unit 33. Thereby, the sticking part 35 sticks to a page P on the left with rotation of the sticking part 35 stopped.

At Step S7, the CPU 366 controls the first drive unit 33 such that the arm part 34 moves from left to right (outward movement).

At Step S8, the CPU 366 determines whether or not a driving time of the first drive unit 33 exceeds a second predetermined time. When determining that the driving time does not exceed the second predetermined time, the CPU 366 keeps driving the first drive unit 33. When determining that the driving time exceeds the second predetermined time, the CPU shifts the processing to Step S9. The second predetermined time is set at a time (time length) shorter than the first predetermined time. In particular, it is preferable that the second predetermined time period is set from a time for the arm part 34 to move from the start point to around the middle point of the outward movement to a time for the arm part 34 to move from the start point to almost the end point of the outward movement.

Figure 12:
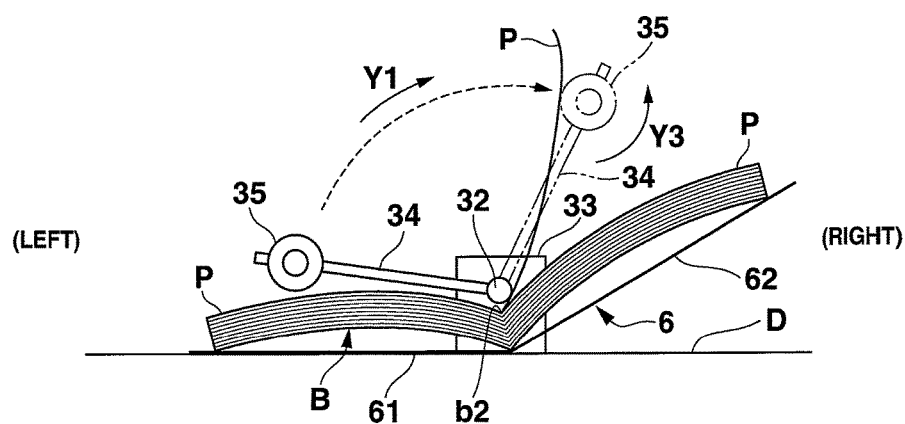
FIG. 12 is an elevation view showing a route and a rotating direction of the sticking part in an outward movement of the arm part according to the embodiment.

At Step S9, the CPU 366 controls the second drive unit 37 to rotate the sticking part 35 while keeping driving the first drive unit 33. This rotation changes the adhesive power of the sticking part 35 when the sticking part 35 separates from a page P, so that the sticking part 35 can reliably separate from the page P. As shown in FIG. 12, the arm part 34 rotates clockwise (arrow Y1) in the outward movement. In order to improve the separation performance, it is preferable that the second drive unit 37 rotate the sticking part 35 in a direction opposite to the swing direction of the arm part 34, i.e. counterclockwise (arrow Y3).

At Step S10, the CPU 366 determines whether or not the driving time of the first drive unit 33 exceeds the first predetermined time. When determining that the driving time does not exceed the first predetermined time, the CPU 366 keeps driving the first drive unit 33 and the second drive unit 37. When determining that the driving time exceeds the first predetermined time, the CPU 366 shifts the processing to Step S11.

At Step S11, the CPU 366 stops the first drive unit 33 and the second drive unit 37. The sticking page P is separated from the sticking part 35 while the second drive unit 37 rotates. Thereby, the sticking part 35 is located at a position apart from pages P of the destination position with no page P sticking thereto. The sticking part 35 and the arm part 34 at this position are outside the angle of view of the camera 22. Thus the whole turning unit 30 is outside the angle of view of the camera 22. (See FIG. 2A.)

Figure 13:
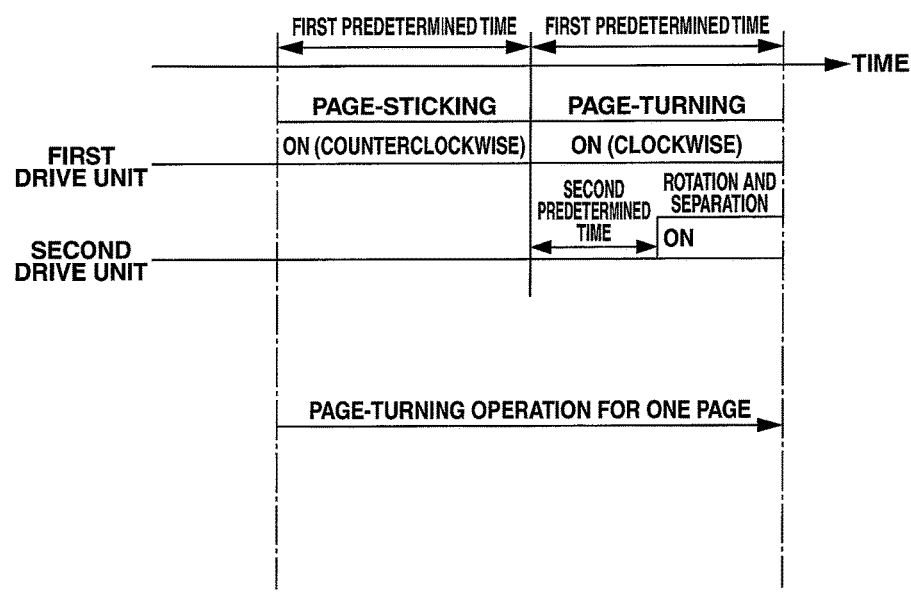
FIG. 13 is a timing chart showing drive timings of the first drive unit and the second drive unit in the page-turning operation for one page according to the embodiment.

FIG. 13 illustrates drive timings of the first drive unit 33 and the second drive unit 37 in the page-turning operation for one page.

In the embodiment, a drive end timing when the second drive unit 37 stops coincides with a drive end timing when the first drive unit 33 stops. However, the drive end timing when the second drive unit 37 stops may be earlier than the drive end timing when the first drive unit 33 stops.

At Step S12, the CPU 366 outputs a signal which indicates completion of the page-turning processing to the computer 4.

At Step S13, the computer 4 controls the camera 22 on the basis of the inputted signal which indicates completion of the page-turning operation so that the pages P opened at present (spread state) are imaged (image pickup). At the time, since the turning unit 30 and the blower 5 are outside the angle of view of the camera 22, only the pages P opened at present are imaged. Picked-up image data generated by the camera 22 are numbered one by one (each imaging) as the basic image G and stored in a storage unit 41 of the computer 4.

At Step S14, the CPU 366 adds one to the value N and stores the result in the RAM 364.

At Step S15, the CPU 366 determines whether or not the value N exceeds a first threshold. When determining that the value N exceeds the first threshold, the CPU 366 shifts the processing to Step S16. When determining that the value N does not exceed the first threshold, the CPU 366 shifts the processing to Step S17. When many pages P are piled up at the destination position, the pages P are likely to return to the departure position. Therefore the first threshold is set at such an amount of turned pages that a wind of the initial air volume can reliably push pages P against the destination position.

At Step S16, the CPU 366 controls the fan unit 54 to make the air volume larger than the initial air volume.

At Step S17, the CPU 366 determines whether or not the value N exceeds a second threshold. When determining that the value N exceeds the second threshold, the CPU 366 shifts the processing to Step S18. When determining that the value N does not exceed the second threshold, the CPU 366 shifts the processing to Step S19. As many pages P are turned, the height of the pages P at the departure position as a whole gets lower, and the lower edge (seam) of the last turned page P at the destination position gets lower. Therefore the second threshold is set at such an amount of turned pages that a wind in the initial wind direction can reliably push pages P against the destination position.

At Step S18, the CPU 366 controls the wind-direction adjustment unit 55 to make the wind direction downward as compared with the initial wind direction.

At Step S19, the CPU 366 determines whether or not the stop switch 365b is operated. When determining that the stop switch 365b is not operated, the CPU 366 shifts the processing to Step S2. When determining that the stop switch 365b is operated, the CPU 366 ends the page-turning processing. In this way, the page-turning operation and the image pickup operation are alternately carried out, and image pickup of the left pages P at the departure position is completed.

After continual imaging of pages P on one side is finished, a user turns the book B upside down and places the book B on the support base 6 such that pages P which are not imaged are positioned on the left support plate 61. Then the above page-turning processing is executed again. In this case, image data of each page P is stored upside down.

Through the above processing, the pages P on the left and right of the book B are continually imaged and stored respectively. After imaging, the storage unit 41 of the computer 4 stores an image data group of the left pages P (the first image data group) and an image data group of the right pages P (the second image data group) separately.

The computer 4 reconstructs the order of data such that each piece of data from the first image data group and each piece of data from the second image data group are alternately aligned in the order of the number of pages P, and combines the pieces of data into a single piece. The storage unit 41 stores the combined data.

In this case, the basic images G are renumbered in accordance with the reconstructed order.

The numbers determined by the renumbering processing are hereinafter referred to as "image numbers."

After the combining processing of the image data, the computer 4 executes page-order checking processing to determine whether the basic images G in the combined image data are aligned in the order of the page number.

In the page-order checking processing, the computer 4 executes a program for recognizing a page number portion Q in each page P and checking of the correctness of the order of the pages P.

Figure 14:
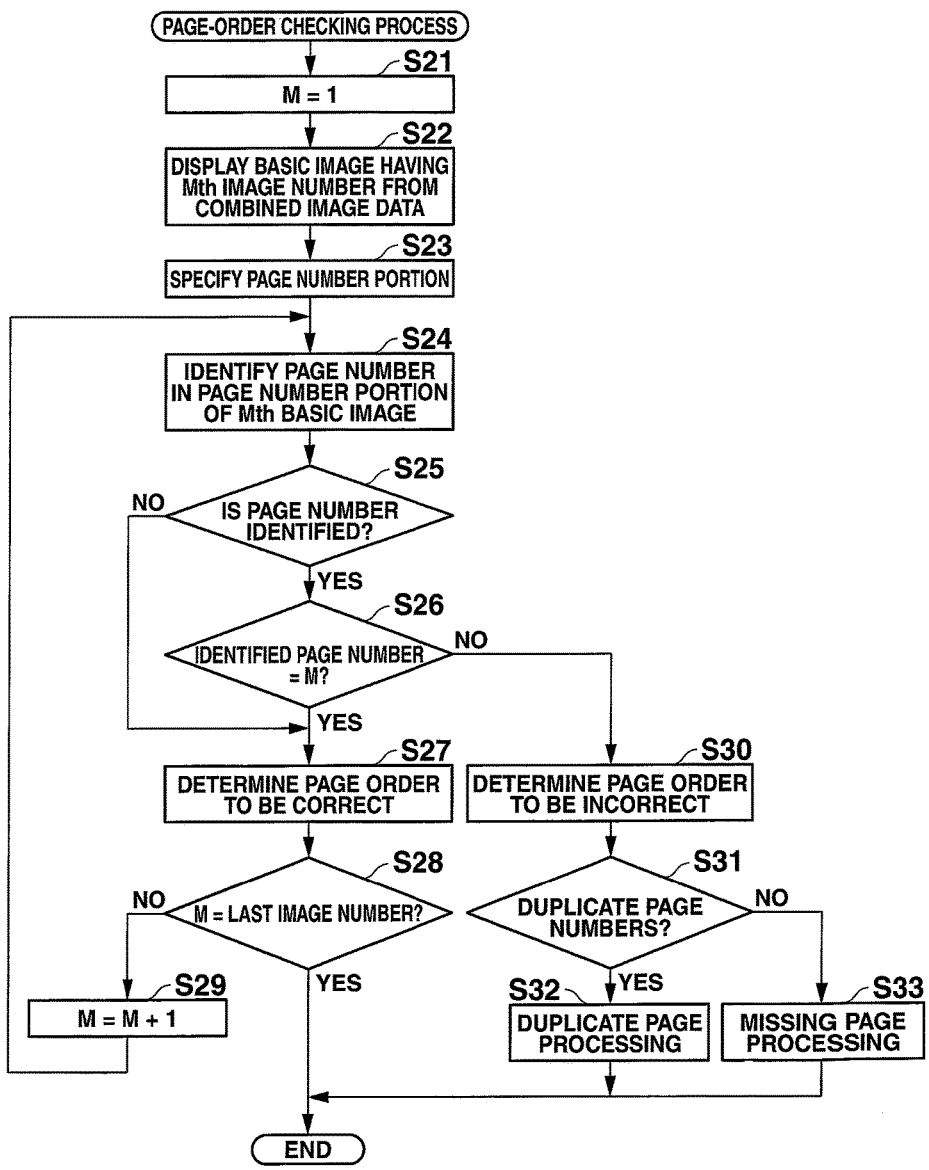
FIG. 14 is a flowchart illustrating a page-order checking processing according to the embodiment.
Figure 15:
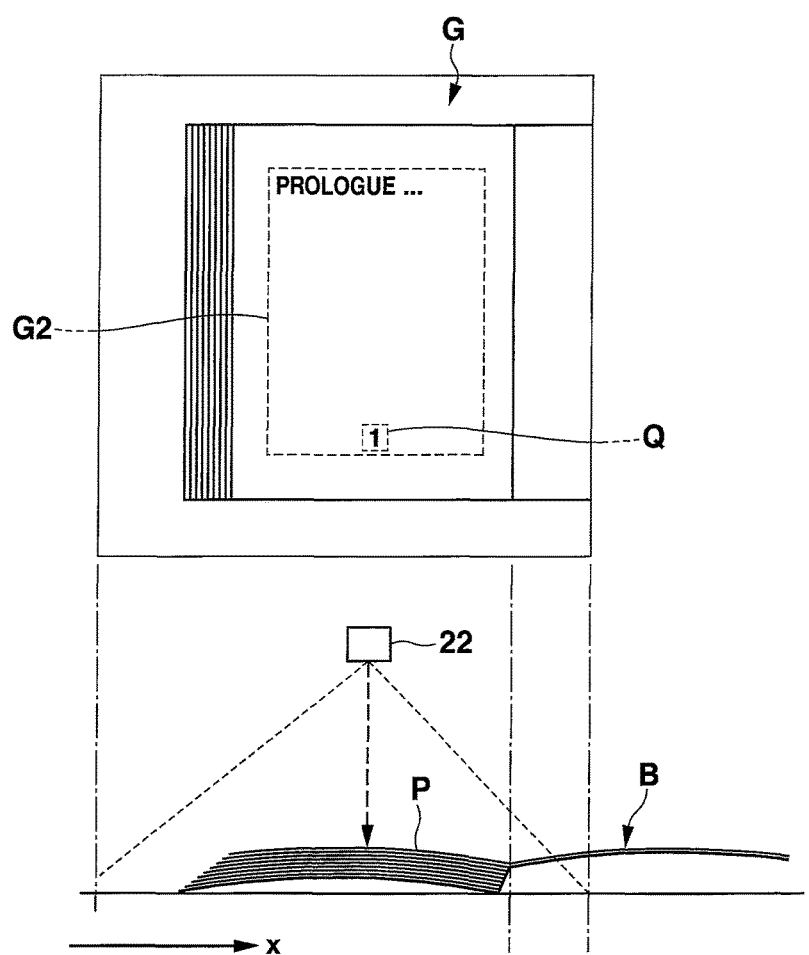
FIG. 15 illustrates a state of a book and a basic image at the beginning of turning the pages of the book, according to the embodiment.

FIG. 14 is a flowchart illustrating the page-order checking processing. FIG. 15 illustrates a state of a book B and a basic image G at the beginning of turning the pages P.

The following description is on an exemplary case where the basic image having the first image number corresponds to the image of the first page P.

In Step S21, the computer 4 sets the value M of the initial page to be read to 1 (M=1).

In Step S22, the computer 4 reads the combined image data from the storage unit 41, and displays a basic image having the Mth image number (first image number in this case) on the screen.

In Step S23, a user manipulates the operation unit 42 to specify the page number portion Q in the Mth basic image G appearing on the screen. That is, the operation unit 42 functions as a specification unit according to the invention for specifying the page number portion Q in a picked-up image. It is preferred that the specified page number portion Q be large enough to encompass a three-digit page number.

In Step S24, the computer 4 identifies the page number through any known character recognition, such as OCR, on the page number portion Q. That is, the computer 4 functions as a recognition unit according to the invention for identifying the page number through character recognition in the specified page number portion Q. If the page number portion Q contains any impeditive image, this image should preferably be removed by masking or filtering to ensure the accuracy of recognition.

In Step S25, the computer 4 determines whether the recognition of the page number is successful. When the recognition is successful, the computer 4 shifts the processing to Step S26. When the recognition is not successful, the computer 4 shifts the processing to Step S27. This control can continue the processing even if any page lacks a printed page number, for example, due to a photograph occupying the entire page.

In Step S26, the computer 4 determines whether the identified page number is identical to the value M. When they are identical, the computer 4 shifts the processing to Step S27. When they are not identical, the computer 4 shifts the processing to Step S30. On the basis of this determination, the computer 4 checks for the correctness of the order of page numbers. That is, the computer 4 functions as a determination unit according to the invention.

In Step S27, the computer 4 determines the order of pages to be correct.

In Step S28, the computer 4 determines whether the current value M is identical to the last image number. When they are identical, the computer 4 completes the page-order checking processing. When they are not identical, the computer 4 shifts the processing to Step S29.

In Step S29, the computer 4 increments the current value M by one, and shifts the processing to Step S24.

In Step S30, the computer 4 determines that the order of pages is incorrect.

In Step S31, the computer 4 determines whether the incorrectness is caused by duplicate page numbers. When the cause is duplicate page numbers, the computer 4 shifts the processing to Step S32. When the cause is a missing page number, the computer 4 shifts the processing to Step S33. In specific, the page number compared in Step S26 is smaller than the value M by two, the computer 4 determines that duplicate images exist in the basic images G obtained through reading of the image data group containing the page P. When the page number compared in Step S26 is larger than the value M by 2×i (i: 1, 2, . . . ), the computer 4 determines that there is a missing image in the basic images G obtained through reading of the image data group containing the page P.

In Step S32, the computer 4 executes duplicate page processing. In specific, the computer 4 displays an error notification indicating that duplicate images exist in the basic images G on the screen to notify the user of the error, and deletes an extra one of the duplicate basic images G. After executing the duplicate page processing, the computer 4 completes the page-order checking processing.

When the order of pages is incorrect, the computer 4 notifies the user of the error in either case. That is, the computer 4 functions as a notification unit according to the invention.

In Step S33, the computer 4 executes missing page processing. In specific, the computer 4 displays an error notification indicating that there is a missing image in the basic images G on the screen to notify the user of the error. The notification promotes the user to pick up an image of the missing page and incorporate the image into a proper place in the order. After executing the missing page processing, the computer 4 completes the page-order checking processing.

Through the repetition of Steps S22 to S29, the processing recognizes the character strings in the page number portions Q and checks for the correctness of the order of page numbers for all the images picked up from the beginning to the end of turning the pages.

Although the basic image having the first image number corresponds to the image of the first page P in the above example of page-order checking processing according to the embodiment, the basic image having the first image number may correspond to an image of the second or later page P. In such a case, the value M should be set to be not 1 but the number of the initial page to be read, in Step S21.

After the page-order checking processing, the computer 4 executes trimming processing to extract a predetermined area G2 (see FIG. 15) from the basic image G of each page P. The predetermined area G2 is specified in advance by the user through manipulation of the operation unit 42. The computer 4 executes the trimming processing on all the basic images G on the basis of the specified predetermined area G2.

As described above, according to the embodiment, the computer 4 identifies the page number in each of the picked-up basic images G and checks for the correctness of the order of page numbers. This configuration can facilitate checking for duplicate pages and a missing page in the scanned pages without a visual check by the user. In addition, the notification of an error in the order of pages can surely inform the user of the error.

Since an extra one of the duplicate basic images G is deleted when duplicate page numbers exist, the electronic data is easy to view. Additionally, the minimized number of images can reduce the data size.

Since the page-order checking processing is executed on all the images picked up from the beginning to the end of turning the pages P, the page-order checking processing is executed on, all the images at once. This configuration can accelerate the page-order checking processing.

The page-order checking processing is executed on all the images picked up from the beginning to the end of turning the pages P before the trimming processing. This configuration can avoid an unnecessary trimming processing when the order of pages is incorrect.

The invention is not limited to the above embodiment, and several modifications can be applied thereto appropriately.

In the above embodiment, the sticking part 35 has the adhesive component 352, and the sticking part 35 sticks to a page P by the adhesive power of the adhesive component 352. However, it is also possible that the sticking part 35 sticks to a page P by suction etc. In this case, for example, a communicating hole which communicates with an inner space of the sticking part 35 is formed on the circumference surface of the sticking part 35 so that the inner space of the sticking part 35 and a pump communicate with each other, and by driving the pump such that the inner space is under negative pressure, sucking power acts onto the communicating hole. Thereby, the sticking part 35 can stick to a page P by the suction power.

Other than suction and adhesion, sticking by electrostatic attraction can be applied to the sticking part 35.

In the above embodiment, an example case where a user operates the operation unit 42 to specify the page number portion Q is shown. Alternatively, the computer 4 may analyze the basic image G through image processing, to recognize a numeric portion separately from the other portion containing text in the basic image G, and specify the recognized numeric portion as the page number portion Q. In this case, the computer 4 functions as the specification unit according to the invention.

In the above embodiment, pages P on only one side of the book B are imaged at Step S13, the first image data group is obtained, the book B is re-positioned, the second image data group is obtained by imaging pages P on the other side, both of the data groups are trimmed, and the data is reconstructed such that the pages P line up in order. Instead of the above embodiment, it is also possible to image the pages on the both sides of an opened book at once. In this case, the odd pages and even pages are separated from each other and individually subjected to proper image processing.

In the above-described embodiment, the character recognition and the checking of the correctness of the page order are executed on all the images picked up from the beginning to the end of turning the pages P as steps of the page-order checking processing. Alternatively, the character recognition and the checking of the correctness of the page order may be executed during the page-turning operation by the page-turning device 3.

In specific, a basic image G of a single page is picked up in Step S13 in FIG. 11, and then input from the camera 22 into the computer 4. The computer 4 identifies the page number in a page number portion Q of the basic image G through known character recognition. The page number portion Q may be specified in advance through manipulation of the operation unit 42 by the user, or automatically specified by the computer 4.

The computer 4 then determines whether the identified page number is larger than the previously identified page number by just a predetermined number. In this example, the odd pages and even pages are separately picked up in sequence; hence, the predetermined number is 2. This determination is not directed to the initially picked-up basic image G.

When the currently identified page number is larger than the previously identified page number by the predetermined number, the computer 4 determines the order of pages to be correct and allows the subsequent operations.

When the currently identified page number is not larger than the previously identified page number by the predetermined number, the computer 4 determines that the order of pages is incorrect.

The computer 4 then determines whether the incorrectness is caused by duplicate page numbers. In specific, when the currently identified page number is identical to the previously identified page number, the computer 4 determines that duplicate pages P exist. When the currently identified page number is larger than the previously identified page number by more than the predetermined number, the computer 4 determines that there is a missing page P.

When the computer 4 determines that duplicate pages P exist, it displays an error notification indicating that duplicate images exist in the basic images G on the screen to notify the user of the error, and outputs signals (checking operation instruction signals) to instruct the control unit 36 of the page-turning device 3 to switch to a page-turning operation in a duplication avoidance mode.

Upon reception of the checking operation instruction signals from the computer 4, the control unit 36 of the page-turning device 3 executes the page-turning operation in the duplication avoidance mode, which causes the arm part 34 to swing slower than the normal page-turning operation. In parallel with this operation, the picking up of basic images G with the camera 22, and the character recognition and the checking of the correctness of the page order with the computer 4, are also executed. When the computer 4 determines the order of pages to be correct during the page-turning operation in the duplication avoidance mode, the computer 4 outputs signals (recovery instruction signals) to instruct the control unit 36 of the page-turning device 3 to recover the normal page-turning operation. Upon reception of the recovery instruction signals from the computer 4, the control unit 36 of the page-turning device 3 executes the normal page-turning operation. In other words, the page-turning operation in the duplication avoidance mode is repeated until the determination of the correctness of the page order.

The computer 4 counts the number of times of determination of duplicate page numbers during the page-turning operation in the duplication avoidance mode. The number of times exceeding a predetermined number indicates a high probability of functional deterioration of the sticking part 35; hence, the computer 4 displays a notification to prompt checking of the functionality of the sticking part 35 on the screen. In specific, the notification prompts replacement of the adhesive component 352. The replacement of the adhesive component 352 refers to the replacement of the entire adhesive component 352, or the removal of the outermost layer of the adhesive component 352.

When the computer 4 determines that there is a missing page P, it displays an error notification indicating that there is a missing image in the basic images G on the screen to notify the user of the error, and outputs signals (stop instruction signals) to instruct the control unit 36 of the page-turning device 3 to stop the page-turning operation. Upon reception of the stop instruction signals from the computer 4, the control unit 36 of the page-turning device 3 stops the page-turning operation. After the stop of the operation, the user adjusts the state of the book B such that an image of the missing page P is picked up, and then resumes the page-turning operation.

According to the embodiment, the character recognition and the checking of the correctness of the page order are executed in parallel with the page-turning operation of the page-turning device 3, so that an error in the order of pages is notified upon the occurrence of the error. The error can therefore be dealt with upon its occurrence, to avoid an unnecessary page-turning operation or picking up of an image.

When the computer 4 determines that duplicate page numbers exist, the page-turning device 3 repeats the page-turning operation until the computer 4 determines that the order of pages is correct. This configuration can appropriately provide the user with an opportunity to correct the duplication.

During the page-turning operation in the duplication avoidance mode, the arm part 34 swings slower than the normal page-turning operation. That is, the page-turning operation is more likely to be successful in the duplication avoidance mode.

When the number of times of determination of duplicate page numbers reaches the predetermined number during the repetition of the page-turning operation in the duplication avoidance mode, a notification promotes the user to check the functionality of the sticking part 35. The user can therefore easily find a component that is a possible cause of the error.

When the number of times of determination of duplicate page numbers reaches the predetermined number during the repetition of the page-turning operation in the duplication avoidance mode, a notification promotes the user to replace the adhesive component 352. The user can therefore easily find measures against the error.

The page-turning device 3 may stop the page-turning operation when the computer 4 determines that duplicate page numbers exist. This control can avoid an unnecessary page-turning operation and picking up of an image after the occurrence of the error.

When the computer 4 determines that there is a missing page number, the page-turning device 3 stops the page-turning operation. This control can avoid an unnecessary page-turning operation and picking up of an image after the occurrence of the error.

The computer 4 displays a visual notification on the screen as in the above-described embodiment. Alternatively, it can also execute a sound notification.

Though several embodiments of the present invention are illustrated, the scope of the invention is not limited to the above embodiments but includes the scope of claims attached below and the scope of their equivalents.

What is claimed is:

1. A document camera system comprising:
    an adhesive component which sticks to an opened page of a book and which is replaceable;
    a mechanism which moves the adhesive component to and fro between a departure position and a destination position such that the adhesive component sticks to a page at the departure position and separates from the page at the destination position to turn pages of the book;
    an image pickup unit which picks up an image of a page which is at the departure position and which is to be turned next every time the adhesive component is moved to the destination position;
    a recognition unit which recognizes a page number of the page which is at the departure position and which is to be turned next based on the image picked up by the image pickup unit;
    a determination unit which determines that an adhesive power of the adhesive component has weakened when the page number recognized by the recognition unit is the same for more than a predetermined number of times; and
    a notification unit which notifies a user to replace the adhesive component when the determination unit determines that the adhesive power of the adhesive component has weakened,
    wherein the adhesive component includes an adhesive surface which contacts a page,
    wherein the adhesive component is a wound sheet, and
    wherein perforations are formed at predetermined length intervals on the wound sheet.

2. A method comprising:
    moving an adhesive component to and fro between a departure position and a destination position to turn pages of a book, such that the adhesive component sticks to a page at the departure position and separates from the page at the destination position, the adhesive component being able to stick to an opened page of the book and being replaceable;
    picking up an image of a page which is at the departure position and which is to be turned next every time the adhesive component is moved to the destination position;
    recognizing a page number of the page which is at the departure position and which is to be turned next based on the picked up image;
    determining that an adhesive power of the adhesive component has weakened when the recognized page number is the same for more than a predetermined number of times; and
    notifying a user to replace the adhesive component when it is determined that the adhesive power of the adhesive component has weakened,
    wherein the adhesive component includes an adhesive surface which contacts a page,
    wherein the adhesive component is a wound sheet, and
    wherein perforations are formed at predetermined length intervals on the wound sheet.

* * * * *